United States Patent
Dürbaum et al.

(10) Patent No.: US 7,239,114 B2
(45) Date of Patent: Jul. 3, 2007

(54) CONVERTER FOR DIRECT CURRENT-TO-DIRECT CURRENT DOWNWARD CONVERSION

(75) Inventors: Thomas Dürbaum, Langerwehe (DE); Reinhold Elferich, Aachen (DE); Tobias Tolle, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 29 days.

(21) Appl. No.: 10/521,853

(22) PCT Filed: Jul. 16, 2003

(86) PCT No.: PCT/IB03/03226

§ 371 (c)(1), (2), (4) Date: Jul. 25, 2005

(87) PCT Pub. No.: WO2004/013950

PCT Pub. Date: Feb. 12, 2004

(65) Prior Publication Data

US 2006/0164051 A1  Jul. 27, 2006

(30) Foreign Application Priority Data

Jul. 26, 2002 (DE) ................... 102 34 080

(51) Int. Cl.
*G05F 1/613* (2006.01)

(52) U.S. Cl. .................... 323/224

(58) Field of Classification Search ........ 323/224, 323/282, 284, 272
See application file for complete search history.

(56) References Cited

U.S. PATENT DOCUMENTS

| | | | | |
|---|---|---|---|---|
| 6,051,961 A * | 4/2000 | Jang et al. | ........... | 323/224 |
| 6,507,174 B1 * | 1/2003 | Qian | ........... | 323/222 |
| 6,512,352 B2 * | 1/2003 | Qian | ........... | 323/282 |
| 6,525,513 B1 * | 2/2003 | Zhao | ........... | 323/222 |
| 6,710,582 B2 * | 3/2004 | Watanabe | ........... | 323/222 |

* cited by examiner

*Primary Examiner*—Shawn Riley
(74) *Attorney, Agent, or Firm*—Paul Im

(57) ABSTRACT

Described herein is a DC/DC down converter which includes a synchronous rectifier, a switching element at its input side, an inductance at its output side and an auxiliary circuit which includes an auxiliary switching element, an auxiliary rectifier and an auxiliary inductance, the auxiliary circuit being coupled to the connection between the synchronous rectifier, the switching element at the input side and the inductance at the output side.

6 Claims, 2 Drawing Sheets

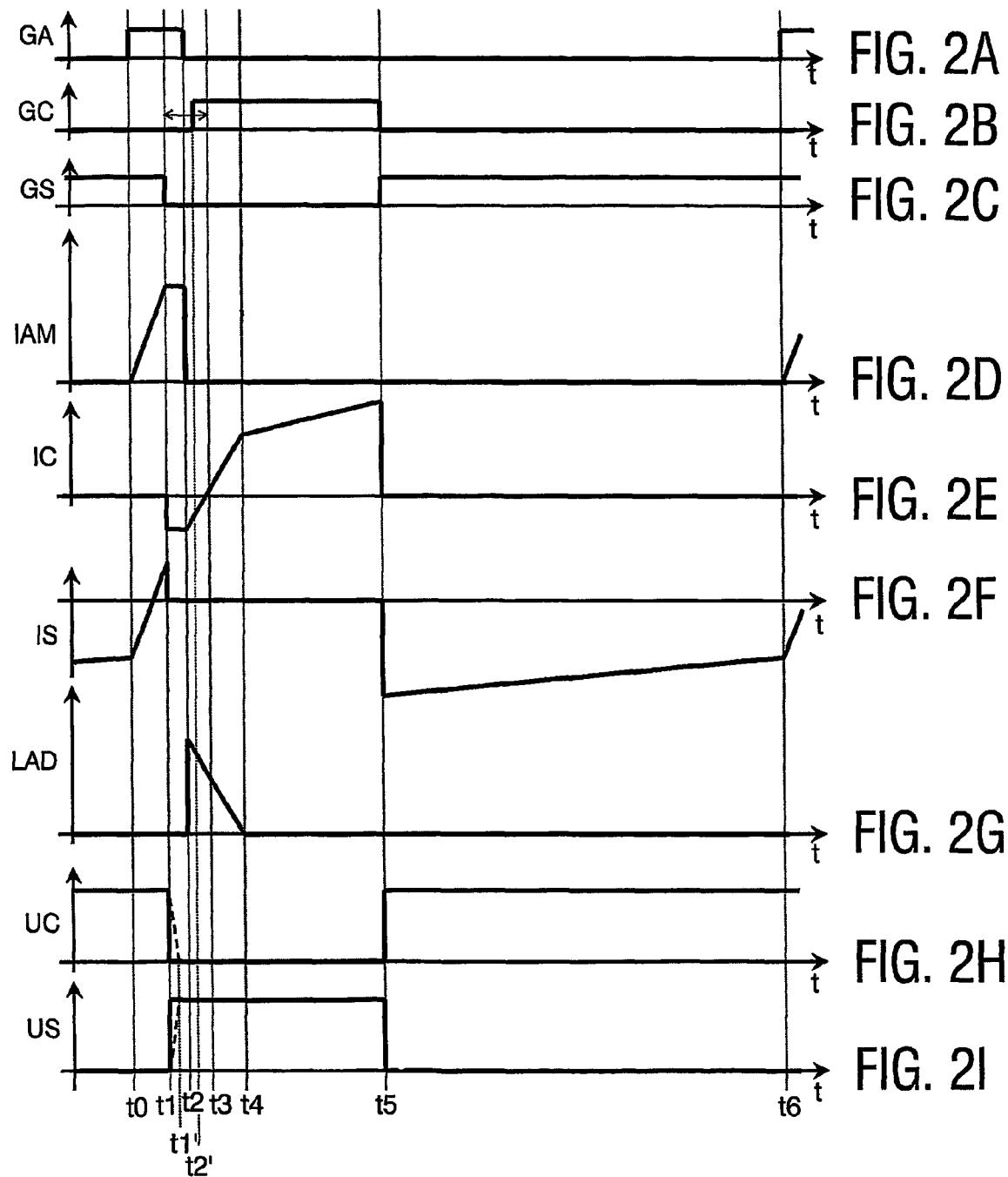

CONVERTER FOR DIRECT CURRENT-TO-DIRECT CURRENT DOWNWARD CONVERSION

The invention relates to a DC/DC down converter which comprises a synchronous rectifier, a switching element at its input side and an inductance at its output side.

DC/DC down converters of this kind (Buck converters for DC/DC conversion) are intended, for example, for power supply of digital switching circuits, notably processors of PCs, where a voltage conversion of typically from 5 . . . 12 volts to 1.5 . . . 3.3 volts takes place. In contemporary digital switching circuits, the DC supply voltage to be generated even goes to values below 1.5 volts; it is then additionally necessary to adapt the DC/DC down converter to increasingly faster load fluctuations. Therefore, the down converter has to operate with correspondingly high switching frequencies of the switching elements used (synchronous rectifier and switching element at the input side customarily being field effect transistors); however, increasing switching frequencies give rise to increasing losses. Therefore, the switching frequency cannot be increased at will. In order to permit faster load fluctuations nevertheless, the output filter capacitances of the relevant down converter are increased; however, such an increase leads to higher costs.

As the switching frequencies become higher, the ratio of the switching losses to the losses produced in the conductive state of the switching elements become larger and larger. On the one hand, the losses which occur due to the alternating turning on and off of the synchronous rectifier and the switching element at the input side become larger and larger because of the simultaneous presence of currents and voltages on the switching elements during the transition between turn-on phases and turn-off phases. On the other hand, as the switching frequencies increase, losses which are due to reverse flow or reverse recovery of the body diode of the synchronous rectifier, which is customarily implemented as a field effect transistor, start to form a substantial part of the overall losses. Moreover, losses are also caused by the hard switching of the parasitic capacitances (notably of the two switching elements).

It is an object of the present invention to provide a DC/DC down converter which permits fast load fluctuations, which is as economical as possible and in which the operating losses are as low as possible.

This object is achieved by means of an auxiliary circuit which includes an auxiliary switching element, an auxiliary rectifier and an auxiliary inductance, the auxiliary circuit being coupled to the connection between the synchronous rectifier, the switching element at the input side and the inductance at the output side.

Using an auxiliary circuit of this kind, practically voltage-free or so-called zero voltage switching can be achieved for the switching element at the input side as well as for the synchronous rectifier while losses due to reverse recovery of the body diode of the synchronous rectifier can be avoided at the same time.

An exemplary embodiment of the present invention elucidates the arrangement of the elements of the auxiliary circuit.

The characteristics of a further exemplary embodiment of the present invention define the time slot in which the auxiliary switching element is in the turned-on state, so that losses due to reverse recovery of the body diode of the synchronous rectifier are avoided.

A further exemplary embodiment of the present invention describes the turn-on instant of the switching element at the input side, thus enabling zero-voltage switching. As an alternative, a further exemplary embodiment of the present invention discloses a voltage measurement so that it can be ensured that the switching element at the input side is turned on when the voltage is sufficiently low.

A further exemplary embodiment of the resent invention discloses a suitable turn-off instant for the synchronous rectifier.

An embodiment of the invention will be described in detail hereinafter with reference to the drawings. Therein:

FIGS. 2A to 2I show the variations of voltages and currents as a function of time during operation of the DC/DC down converter shown in FIG. 1.

Figure 1:
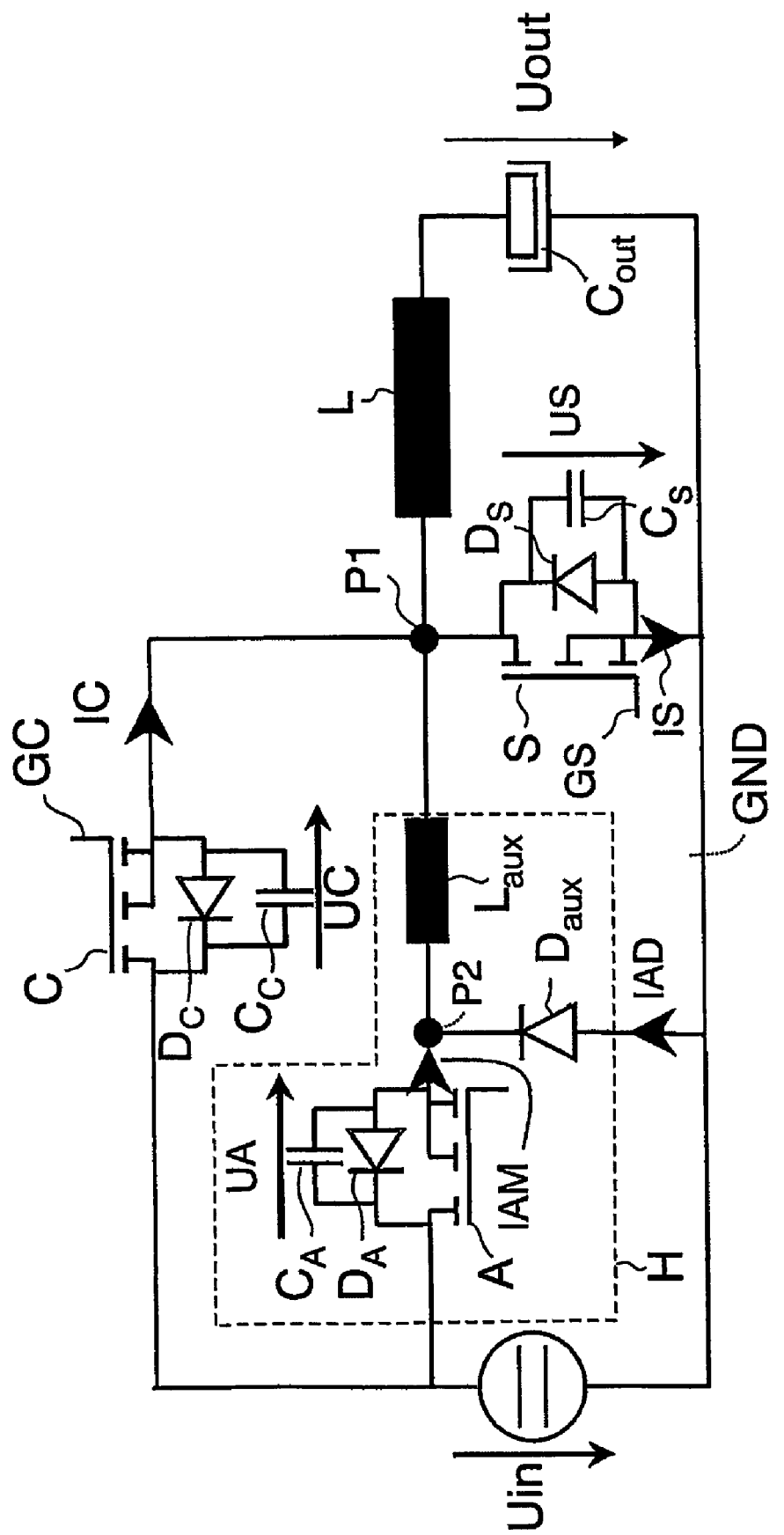
FIG. 1 shows a DC/DC down converter in accordance with the invention.

The DC/DC down converter shown in FIG. 1 comprises a switching element C at the input side, a synchronous rectifier S and an inductance L at the output side. The switching element C at the input side and the synchronous rectifier S are both implemented as field effect transistors. The switching element C includes a body diode $D_C$ which is connected between its drain terminal and its source terminal and also includes a capacitance $C_C$ which is connected parallel thereto and which may also include, if necessary, an external capacitance in addition to the parasitic capacitance of the switching element C. The synchronous rectifier S includes a body diode $D_S$ which is connected between its drain terminal and its source terminal and also a capacitance $C_S$ which is connected parallel thereto and which may also include, if necessary, an external capacitance in addition to the parasitic capacitance of the synchronous rectifier S. The switching element C, the synchronous rectifier S and the inductance L are connected in a star configuration and are connected to one another at a node P1. An input voltage Uin is applied to the input of the DC/DC down converter. An output voltage Uout can be derived from the output of the DC/DC down converter, which output voltage drops off across an output capacitance $C_{out}$ which may comprise one or more capacitors. The output capacitance $C_{out}$ is connected in series with the inductance L.

There is also provided an auxiliary circuit H which consists of an auxiliary switching element A, an auxiliary rectifier $D_{aux}$ which is constructed as a diode, and a small auxiliary inductance $L_{aux}$ which is constructed as a coil, said elements being connected in a star configuration with a node P2. The auxiliary switching element A is implemented as a field effect transistor with a body diode $D_A$ which is connected between the drain and source terminals and a capacitance $C_A$ which is connected parallel thereto and which constitutes the parasitic capacitance of the auxiliary switching element A. The auxiliary circuit H is connected to the node P1 and is situated between the input of the DC/DC down converter, carrying the voltage Uin, and the synchronous rectifier S. The drain terminal of the auxiliary switching element A is then connected to the input terminal carrying the positive potential of the input voltage Uin. The other input terminal is connected to a reference potential GND which is also connected to the anode of the diode $D_{aux}$, the source terminal of the synchronous rectifier S and a terminal of the output capacitance $C_{out}$. The cathode of the diode $D_{aux}$ is connected to the source terminal of the auxiliary switching element A and to a terminal of the auxiliary inductance $L_{aux}$, the other terminal of the auxiliary inductance $L_{aux}$ being connected to the point P1.

FIGS. 2A to 2I show various variations of voltages and currents so as to illustrate the operation of the circuit arrangement in conformity with FIG. 1.

FIG. 2A: potential GA on the control terminal (gate terminal) of the auxiliary switching element A;

FIG. 2B: potential GC on the control terminal (gate terminal) of the switching element C at the input side;

FIG. 2C: potential GS on the control terminal (gate terminal) of the synchronous rectifier S;

FIG. 2D: current IAM through the auxiliary switching element A in the direction of the node P2;

FIG. 2E: current IC through the switching element C at the input side in the direction of the node P1;

FIG. 2F: current IS through the synchronous rectifier S in the direction from the node P1 to the reference potential GND;

FIG. 2G: current IAD from the reference potential GND through the auxiliary rectifier $D_{aux}$ in the direction of the node P2;

FIG. 2H: voltage UC on the switching element C on the input side in the direction from the input voltage Uin to the node P1, and FIG. 2I: voltage US on the synchronous rectifier in the direction from the node P1 to the reference potential GND.

Interval $t0 \leq t < t1$:

At the instant t0 the auxiliary switching element A is turned on. At this instant the switching element C at the input side is turned off and the synchronous rectifier S is turned on. As a result of the turning on of the auxiliary switching element A, the current IAM increases steeply from the value zero, the steepness of the rise being dependent on the value of the inductance $L_{aux}$ which is small in comparison with the inductance L. The auxiliary switching element A is thus turned on with so-called zero current switching, that is, at a current IAM equal to zero. The current IC through the switching element C at the input side equals zero. On the current IS, increasing with a flat rise until the instant t0 (corresponding to a decrease of the absolute value of the current IS which is negative until this instant), there is superposed the current IAM, so that IS increases with a correspondingly steeper rise and enters the positive range of values between the instant t0 and a subsequent instant t1, so that as from that instant the synchronous rectifier can be turned off (with positive values of IS) without reverse recovery (generating losses) of the body diode DS, because the body diode has never conducted current in the case of customarily used MOSFETs. The rectifier $D_{aux}$ is turned off and IAD is zero for as long as the auxiliary switching element A is turned on. The voltage UC is equal to the input voltage Uin. The voltage US equals zero.

Interval $t1 \leq t < t2$:

The auxiliary switching element A remains turned on and the switching element C now remains turned off; however, the turning on of the switching element C is permissible in principle as from the instant t1 (denoted by the double arrow on the ascending edge of the control potential GC in FIG. 2B), since as from this instant the current IC is negative and hence, while the body diode $D_C$ is turned on, the switching element C can be turned on with zero voltage switching which minimizes switching losses. The synchronous rectifier S is turned off at the instant t1. The current IAM remains essentially constant between the instants t1 and t2. The current IC assumes a negative value and remains substantially constant until the instant t2. The current IS has now assumed the value zero. The current IAD is still zero. The voltage UC returns to zero, the steepness of the drop of UC being dependent on the value of the capacitances $C_C$ and $C_S$ which is switched during the drop. The dashed descending line in FIG. 2A represents a case where the voltage has dropped to zero in a delayed fashion only at the instant t1'. Preferably, the voltage UC is measured and compared with a threshold value; when the voltage UC has decreased sufficiently, the switching element C can be turned on, only correspondingly small losses then being induced in the switching element C. The voltage US on the switching element S increases to the value of the input voltage Uin as from the instant t1, the steepness of the rise again being dependent on the value of the capacitances $C_C$ and $C_S$ switched during the rise of the voltage US. The dashed ascending line in FIG. 2I represents a case where the voltage US has increased to the value of Uin in a delayed fashion only at the instant t1'. The switching element S is turned off at the instant t1 with zero voltage switching, that is, US is equal to zero at the instant t1.

Interval $t2 \leq t < t3$:

At the instant t2 the auxiliary switching element A is turned off, so that the current IAM becomes zero. The inductance $L_{aux}$ is discharged via the rectifier $D_{aux}$ wherethrough a decreasing current IAD flows at this time. The absolute value of the current IC decreases from the (negative) value at the instant t2 until it reaches the value zero at the instant t3. The switching element C is turned on at the instant t2'; this takes place while the body diode $D_C$ is turned on or while a voltage $U_C$ is detected whose absolute value is sufficiently low, that is, with zero voltage switching (see also the above description in relation to the instant $t1 \leq t < t2$ for the interval in which the switching element C can be turned on).

Interval $t3 \leq t < t4$:

The auxiliary switching element A and the synchronous rectifier S remain turned off and the switching element C remains turned on. The current IAD through the auxiliary rectifier $D_{aux}$ continues to decrease with the same steepness as in the time interval $t2 - t < t3$. At the instant t4 the current IAD has decreased to zero. The current IC continues to increase constantly with the same steepness as in the time interval $t2 \leq t < t3$ with the value zero at the instant t3.

Time Interval $t4 - t < t5$:

At the instant t4 the auxiliary inductance $L_{aux}$ has been completely discharged and hence the current IAD has reached the value zero and remains zero. As a result, while the switching element C is still turned on the current IC increases less strongly than in the time interval $t3 \leq t < t4$.

Time Interval $t5 \leq t < t6$:

At the instant t5 the switching element C is turned off and the synchronous rectifier S is turned on. Consequently, the current IC decreases to zero. At the instant t5 the current IS jumps from zero to a negative value as from which the current IS increases until the instant t6 while its absolute value decreases accordingly (in the case of small loads or a zero load IS increases to positive values until the instant t6). The voltage UC increases to the value of Uin at the instant t5. Because the associated switching of the capacitances $C_C$ and $C_S$ cannot be arbitrarily fast, and the corresponding rise of the voltage UC and decrease of the voltage US do not take place with an infinite steepness, a small idle time (not recognizable in the FIGS. 2A to 2I) is provided for turning on the switching element S; this means that the switching element S is turned on only a brief period of time after the turning off of the switching element C, thus ensuring that the turning on of the switching element S takes place with zero voltage switching.

The operations described for the interval from t0 to t6 are repeated as from the instant t6.

The events taking place between the instants t0 and t4 are shown so as to be stretched in time in the FIGS. 2A to 2I for a better illustration of the invention. In reality the ratio of the interval from t0 to t4 to the interval t0 to t6 is significantly smaller than shown in the FIGS. 2A to 2I.

The invention claimed is:

1. A DC/DC down converter which comprises a synchronous rectifier, a switching element at its input side, an inductance at its output side and an auxiliary circuit which includes an auxiliary switching element, an auxiliary rectifier and an auxiliary inductance, the auxiliary circuit being coupled to the connection between the synchronous rectifier, the switching element at the input side and the inductance at the output side.

2. A DC/DC down converter as claimed in claim 1, characterized in that first terminals of the auxiliary switching element, of the auxiliary rectifier and of the auxiliary inductance are connected to one another, the second terminal of the auxiliary switching element being connected to an input terminal of the down converter, the second input terminal of the down-converter being connected to the second terminal of the auxiliary rectifier and to a terminal of the synchronous rectifier, and the second terminal of the auxiliary inductance being connected to the second terminal of the synchronous rectifier.

3. A DC/DC down converter as claimed in claim 1 or 2, characterized in that it is arranged to turn on the auxiliary switching element while the synchronous rectifier is turned on and while the switching element at the input side is turned off, and also that the auxiliary switching element is turned off after the subsequent turning off of the synchronous rectifier.

4. A DC/DC down converter as claimed in one of the claims 1 to 3, characterized in that it is arranged to turn on the switching element at the input side, being implemented as a field effect transistor, when a current flows in the forward direction of the body diode of the switching element at the input side.

5. A DC/DC down converter as claimed in one of the claims 1 to 3, characterized in that it is arranged to measure the voltage on the switching element at the input side and to turn on the switching element at the input side only when the measured voltage on the switching element at the input side has reached a selectable threshold value.

6. A DC/DC down converter as claimed in one of the claims 1 to 5, characterized in that it is arranged to turn off the synchronous rectifier, being implemented as a field effect transistor, when a current flows from the connection between the synchronous rectifier, the switching element on the input side and the inductance at the output side towards the synchronous rectifier.

* * * * *